April 5, 1938.                S. M. DOVER                2,113,553
                            STOP AND TAIL LAMP
                            Filed Oct. 15, 1936
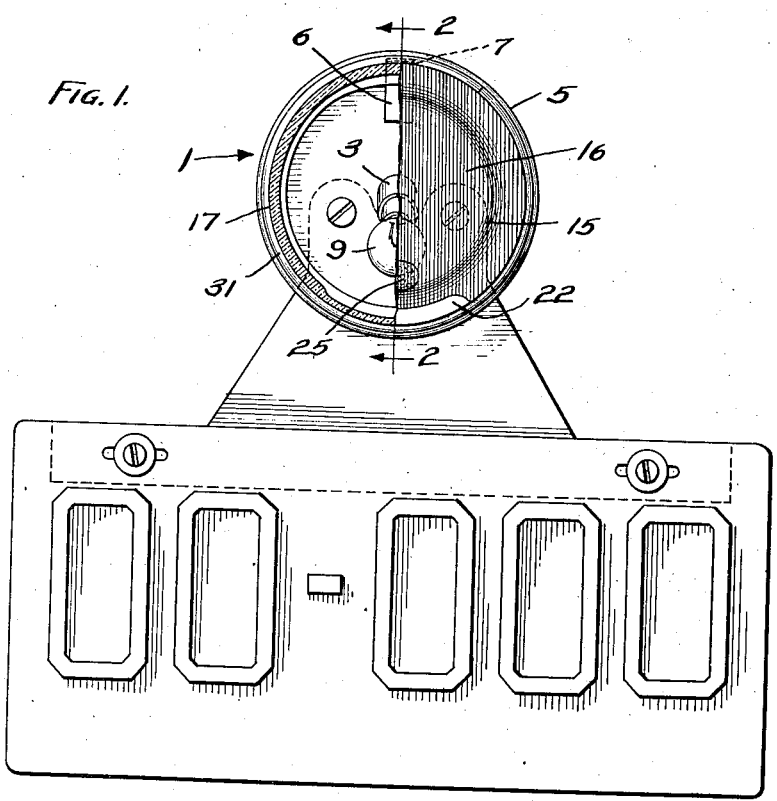
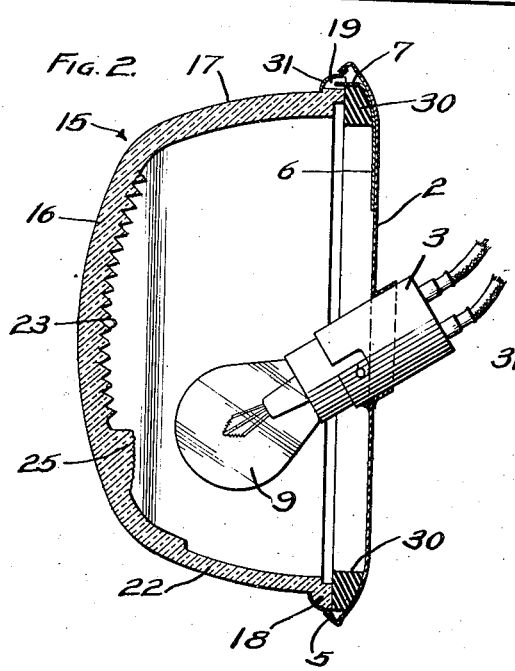
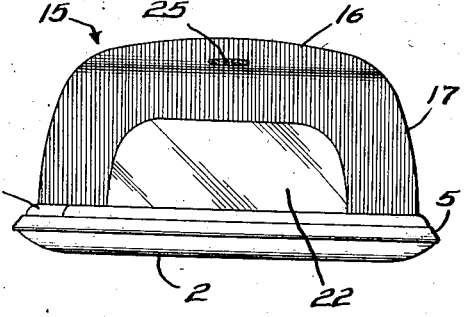
INVENTOR.
SAMUEL M. DOVER,
BY Morris Spector,
ATTORNEY Patented Apr. 5, 1938

2,113,553

UNITED STATES PATENT OFFICE

REISSUED
APR 14 1942

2,113,553

STOP AND TAIL LAMP

Samuel M. Dover, Chicago, Ill.

Application October 15, 1936, Serial No. 105,665

10 Claims. (Cl. 177—329)

This invention relates to automobile stop and tail lamps.

It is one of the objects of the present invention to provide an automobile stop and tail lamp which shall be visible from all possible angles from which it may be approached regardless of the horizontal or inclined position of the automobile; which will direct a beam of light a very great distance so as to be visible to an approaching motorist a great distance away; and which will also illuminate the automobile license plate. It is a further object of the present invention to provide such a lamp wherein the entire glass part thereof constitutes a single piece.

It is a still further object of the present invention to provide a stop and tail lamp housing comprising one integral body of glass the main portion of which is of one color, for instance red to transmit red light indicative of danger, and another portion of which is of another color of higher light transmitting characteristics, or of clear glass, for permitting the passage of light therethrough for illuminating the license plate, or illuminating the roadway to facilitate backing of the automobile.

In recent years, with the advent of higher and higher automobile speeds, it has become necessary to provide a tail lamp which shall be visible at great distances. To increase the distance of visibility, the lens of the lamp is provided with a small portion, popularly known as a "bull's eye", so constructed that it concentrates the light which strikes it from the lamp bulb, and transmits that light as a concentrated beam. For maximum effectiveness of this concentrating portion of the lens the lamp bulb must be at a definite location with respect thereto. On the other hand the bulb must also bear a definite location with respect to the portion of the lens that is of clear glass for illuminating the license plate. It is an object of the present invention to provide a stop and tail lamp of the above character wherein the angular position of the bulb, the location of the license illuminating portion of the lens, and the location of the light concentrating portion thereof are correlated with respect to each other to produce the desired results by the use of a single bulb.

The attainment of the above and further objects of the present invention will be apparent from the following specification taken in conjunction with the accompanying drawing forming a part thereof.

In the drawing:

Figure 1 is a front view, in partial section, of a stop and tail lamp constructed in accordance with the present invention, and illustrating how such lamp illuminates the license plates and adjacent portions of the roadway;

Figure 2 is a longitudinal sectional view of the stop and tail lamp of Figure 1, said view being taken along the line 2—2 of Figure 1; and Figure 3 is a bottom view of the lamp of Figure 2.

The stop and tail lamp is indicated at 1, and includes a back portion 2 having means for mounting the lamp and having also an opening for receiving a bulb socket. A bulb socket 3 is mounted in the socket opening, said socket being at an angle to the back 2 for a purpose which will be set forth more fully as this description proceeds. The back 2 is provided with lens holding means in the form of a forwardly extending inturned rim 5 around the periphery thereof for receiving a holding ring 31 against which the lens bears. It is also provided with a short lens centering piece 6 bent forwardly as indicated at 7, that is adapted to extend into a notch in a lens for centering the lens with respect to the bulb. A two filament electric light bulb 9 is mounted in the socket 3.

The lens, or lamp housing, comprises a unitary body of glass 15 having a red signal part 16 which constitutes the front of the lamp and faces rearwardly of the automobile, and a peripherally extending rim 17 integral with the front 16, so that the rim and the front together form a casing or housing. An outwardly extending flange 18 is formed around the outer periphery of the rim 17. This flange is provided at one place with a centering notch 19 into which the projection 7 extends for centering the lens in the correct angular position in the back 2. The lens proper is formed of red glass which is the accepted color for indicating danger. A portion of the rim 17 is formed of clear glass, as indicated at 22. The clear glass portion 22 is a unitary integral part of the rim 17 and of the front 16, and is appreciably thinner than the adjacent red glass, as is apparent from Figures 1 and 2. The outside surface of the glass body or housing 15 constitutes a continuous smooth surface at the merger of the clearer glass 22 with the rest of the glass, the reduction in thickness being entirely on the inside surface of the lamp housing. To that effect the inside surface of the lamp housing is indented towards the outside surface at the juncture of the colored portion with the clearer glass portion 22, as may be seen in Figure 2. The clear portion 22 and the bulb 9 are so located with respect to one another, and the portion 22 is of such a width, that the light from the electric bulb 9 has a sufficient spread to illuminate the entire automobile license plate. It also illuminates an adjacent part of the roadway and thus facilitates backing up of the automobile, whether it be into a parking space or into a garage.

If desired, the inner surface of the front part 16 of the lens may be provided with projections 23 for reflecting light from the headlights of a rearwardly approaching automobile back to the driver of the approaching automobile. These projections may be of any shape known in the art for accomplishing this result, as buttons, almost right angle cones or tetrahedrons, or the like. It is also provided with a light concentrating portion 25, known as a "bull's eye", which is so constructed and located with respect to the stop light filament of the bulb 9 that it concentrates the incident light from the bulb into a beam of high light intensity having only a slight spread and extending directly rearwardly of the vehicle. The shape and location of the light concentrating portion 25 of the lens must be correlated with the location of the bulb in order to obtain the proper direction and intensity of the concentrated light beam. This result is obtained by locating the portion 25 in a position where the light intensity of the bulb is high, and making the angular position of the bulb with respect to the portion 25 such that the light rays from the bulb will be at a proper angle to the portion 25 so that when they are bent by passage through the portion 25 they will emanate therefrom in the desired direction, namely directly rearwardly of the automobile. Thus the angular position of the bulb is correlated with the position of the portion 25 and with the position of the portion 22. The clearer light from the portion 22, for illuminating the license plate, is in a direction at a very substantial angle to the horizontal rays from the head lights of an approaching automobile. Because of the arrangement illustrated, substantially none of the light from the portion 22 for illuminating the license plate extends rearwardly of the automobile and therefore light from the portion 22 cannot produce any objectionable glare insofar as concerns a motorist following the automobile on which the improved lamp housing above described is located.

It is to be noted that clear glass portion 22 terminates below the normal line of direct vision to the tail lamp when the same is viewed by a pedestrian at the rear of the automobile. If the contour of the portion of the automobile on which the stop and tail lamp is mounted is such that the lens 15 is at a substantial angle to that illustrated in Figure 2, then the clear glass portion 22 may be of greater or lesser width as may be necessary in order to avoid glare, the width being such that the portion of the clear glass closest to the center of the lens is still outside of the direct line of vision to the lens when the same is viewed by a pedestrian at the rear of the lens. The term "glass" is used in this specification and claims in a broad sense to include any suitable transparent medium.

The inside diameter of the rim 5 of the back 2 is greater than the outside diameter of the flange 18 of the lens. The lens rests against a spring comprising a soft sponged rubber ring 30, which forces the lens outwardly. A split ring 31 of spring metal overlies the flange 18 and extends into the rim 5 and serves to limit the outward movement of the lens. Thus the lens is held in place by the outward spring pressure exerted thereagainst by the soft rubber 30 that is compressed by the lens, the split ring 31 serving to resist the spring pressure of the rubber 30, rather than to press the lens against the back 2. The pressure of the rubber serves also to hold the ring 31 in place. In lieu of the soft rubber ring 30 I may use other resilient means for exerting a yielding outward pressure on the rim of the lens or casing 15. Any spring means will serve this purpose, and a metal leaf spring may be used instead of the rubber strip 30.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. An automobile lamp casing comprising a unitary single layer glass body having a signal portion at the part of the casing which faces rearwardly of the automobile, said rearwardly facing signal portion being of red glass throughout the entire thickness of the red rearwardly facing signal portion and having a portion of glass substantially clearer than said signal portion, said clearer portion being substantially entirely outside of the line of direct normal vision to said lamp as viewed by a pedestrian at the rear of the automobile, said red signal portion and said clearer portion being one integral piece of glass with the red portion embracing the clearer portion.

2. An automobile lamp casing comprising a unitary single layer glass body having a signal portion at the part of the casing which faces rearwardly of the automobile, said rearwardly facing signal portion being of red glass throughout the entire thickness of the red rearwardly facing signal portion and having a portion of glass substantially clearer than said signal portion, said clearer portion being substantially entirely outside of the line of direct normal vision to said lamp as viewed by a pedestrian at the rear of the automobile, said red signal portion and said clearer portion being one integral piece of glass, and a light concentrating portion formed in said rearwardly facing signal portion of the glass body.

3. An automobile lamp including a back, and a glass lamp housing, said housing having a front portion and a rim integral with the front portion and extending to the back, means securing the rim to the back, said rim having a restricted portion of clearer glass than the glass of the rest of the rim, which clearer portion is integral with the rest of the rim and with the front of the housing, and of substantially less thickness than the part of the housing adjacent the clearer glass part.

4. An automobile tail lamp lens comprising a colored glass signalling portion having means formed thereon and constructed and arranged to reflect incident light from the headlights of an approaching automobile as a slightly spreading beam substantially parallel to the incident light, said lens including also a clearer glass illuminating portion so located as to direct substantially all of the light emanating therefrom in a direction at a substantial angle to the direction of incident light from the headlights of an approaching automobile for illuminating a region adjacent the lens, said clearer illuminating part and said colored signalling part constituting one integral body of glass with the clearer glass terminating substantially along the region of its contact with the colored glass.

5. An automobile stop and tail lamp including a glass casing having a signal portion at the part of the casing which faces rearwardly of the automobile, said rearwardly facing signal portion merging into a peripherally extending signal portion, said peripherally extending signal portion including a license plate illuminating part of glass of different light transmitting characteristics than the glass of the rearwardly facing signal portion and constituting one unitary piece of glass with said signal portions, an electric light bulb in said casing, said bulb being located to direct light through the license plate illuminating portion of the casing and also through the rearwardly facing signal portion, and said casing having a light concentrating part constructed and located with respect to the bulb to direct a concentrated beam of light from the bulb directly rearwardly of the automobile.

6. An automobile stop and tail lamp comprising a glass casing having a signal portion at the part of the casing which faces rearwardly of the automobile, said rearwardly facing signal part being of colored glass and having a license plate illuminating part of clearer glass than the signalling part and integral with said signalling part, an electric light bulb in said casing, said bulb being adjacent the clearer glass illuminating part to direct an appreciable amount of light through the clearer glass part of the casing, said bulb being so positioned that the most intense zone of light produced thereby is on the colored glass portion of the casing, and light concentrating means formed at the colored glass portion of the lens in the region of high light intensity, said light concentrating means and said bulb being so positioned relative to one another that the light from the bulb falling on the light concentrating means is bent to form a concentrated beam having only a slight spread and extending directly rearward of the automobile.

7. An automobile stop and tail lamp including a glass casing having a signal portion at the part of the casing which faces rearwardly of the automobile, said rearwardly facing signal portion merging into a peripherally extending signal portion, said peripherally extending signal portion including a license plate illuminating part of glass of different light transmitting characteristics than the glass of the rearwardly facing signal portion and constituting one unitary piece of glass with said signal portions, electric lighting means, said electric lighting means including an electric light filament located to direct light through the license plate illuminating portion of the casing and also through the rearwardly facing signal portion, said electric lighting means including a second electric light filament, and said casing having a light concentrating part constructed and located with respect to the second filament to direct a concentrated beam of light from the second filament directly rearwardly of the automobile.

8. An automobile stop and tail lamp including a glass housing having a signal portion at the part of the housing which faces rearwardly of the automobile and having a license plate illuminating part of glass of different color than the color of the signalling portion and constituting one unitary piece of glass with said signal portion, electric lighting means, said electric lighting means including an electric light filament located to direct light through the license plate illuminating portion of the casing and also through the rearwardly facing signal portion, said electric lighting means including a second electric light filament, and said casing having a light concentrating part constructed and located with respect to the second filament to direct a concentrated beam of light from the second filament directly rearwardly of the automobile.

9. An open ended automobile tail lamp housing in the form of a single layer of glass of uniform color throughout its thickness, said housing having a signal portion at the part of the casing which faces rearwardly of the automobile, said rearwardly facing signal portion merging into a peripherally extending signal portion of substantially the same color, said peripherally extending signal portion including a license plate illuminating part of glass of different color than that of the glass of the rearwardly facing signal portion and constituting one unitary piece of glass with said single layer rearwardly facing signal portion, the area embraced by the rearwardly facing signal portion being maximum at the open end of the housing.

10. An automobile tail lamp lens comprising a colored glass signalling portion and a clearer glass illuminating portion at a substantial angle thereto and so located as to direct substantially all of the light emanating therefrom at a substantial angle to horizontal rays of light from the headlights of an approaching automobile, said clearer illuminating part and said colored signalling part constituting one integral body of glass with the clearer glass terminating substantially along the region of its contact with the colored glass, and substantially thinner than the adjacent colored glass, the inside surface of the lens being indented towards the outside surface at the juncture of the colored portion with the clearer portion.

SAMUEL M. DOVER.